(12) United States Patent
Maeda

(10) Patent No.: US 7,552,105 B2
(45) Date of Patent: Jun. 23, 2009

(54) IMPORTANCE DEGREE CALCULATION PROGRAM, IMPORTANCE DEGREE CALCULATION METHOD, AND IMPORTANCE DEGREE CALCULATION APPARATUS

(75) Inventor: Kazuho Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 379 days.

(21) Appl. No.: 11/482,929

(22) Filed: Jul. 10, 2006

(65) Prior Publication Data

US 2007/0214102 A1 Sep. 13, 2007

(30) Foreign Application Priority Data

Mar. 13, 2006 (JP) ............................. 2006-067015

(51) Int. Cl.
*G06F 15/00* (2006.01)
*G06F 15/18* (2006.01)

(52) U.S. Cl. ...................................... 706/62
(58) Field of Classification Search ........................ None
See application file for complete search history.

(56) References Cited

U.S. PATENT DOCUMENTS 7,454,311 B2 * 11/2008 Maeda ...................... 702/179

FOREIGN PATENT DOCUMENTS

JP 2005-302054 10/2005

* cited by examiner

*Primary Examiner*—Michael B Holmes
(74) *Attorney, Agent, or Firm*—Staas & Halsey LLP

(57) ABSTRACT

The present invention has been made to calculate objective variable distribution having high reliability irrespective of the section size in an explanatory variable in which frequency drastically changes to thereby obtain highly reliable importance degree.

An importance degree calculation program comprises: a section generation step that receives, as an input, an instance set and an explanatory variable and uses the instance set to divide the explanatory variable into a plurality of sections to obtain a section set; a neighborhood instance set extraction step that uses the instance set, the section set, and a neighborhood instance number threshold to extract from across all sections a neighborhood instance set of each section in which the number of instances is greater than the neighborhood instance number threshold; an objective variable distribution calculation step that calculates an objective variable distribution from the neighborhood instance set of each section extracted by the neighborhood instance set extraction step; and an importance degree calculation step that calculates importance degree of each section from the objective variable distribution in each section obtained by the objective variable distribution calculation step and instance set.

20 Claims, 16 Drawing Sheets

|  | 20 YEARS OLD AND 3 MILLION | 20 YEARS OLD AND 4 MILLION | 20 YEARS OLD AND 5 MILLION | 30 YEARS OLD AND 3 MILLION | 30 YEARS OLD AND 4 MILLION | 30 YEARS OLD AND 5 MILLION |
|---|---|---|---|---|---|---|
| 20 YEARS OLD AND 3 MILLION | 0 | 0.5 | 1 | 1 | 1.12 | 1.41 |
| 20 YEARS OLD AND 4 MILLION | 0.5 | 0 | 0.5 | 1.12 | 1 | 1.12 |
| 20 YEARS OLD AND 5 MILLION | 1 | 0.5 | 0 | 2 | 1.12 | 1 |
| 30 YEARS OLD AND 3 MILLION | 1 | 1.12 | 1.41 | 0 | 0.5 | 1 |
| 30 YEARS OLD AND 4 MILLION | 1.12 | 1 | 1.12 | 0.5 | 0 | 0.5 |
| 30 YEARS OLD AND 5 MILLION | 1.41 | 1.12 | 1 | 1 | 0.5 | 0 |

FIG. 12

| AGE | NUMBER OF INSTANCES PER ONE-YEAR AGE | OBJECTIVE VARIABLE DISTRIBUTION | IMPORTANCE DEGREE |
|---|---|---|---|
| 26 TO 35 YEARS OLD | 10 | 0.1:0.9 | 0.8 |
| 36 TO 39 YEARS OLD | 100 | 0.1:0.9 | 0.8 |
| 40 TO 44 YEARS OLD | 100 | 0.9:0.1 | 0.8 |

FIG. 13

| AGE | NUMBER OF INSTANCES | OBJECTIVE VARIABLE DISTRIBUTION | IMPORTANCE DEGREE |
|---|---|---|---|
| 26 TO 35 YEARS OLD | 100 | 0.1:0.9 | 0.8 |
| 36 TO 44 YEARS OLD | 900 | 0.54:0.46 | 0.08 |

FIG. 14

| AGE | NUMBER OF INSTANCES IN MOVING AVERAGE WIDTH | OBJECTIVE VARIABLE DISTRIBUTION | IMPORTANCE DEGREE |
|---|---|---|---|
| 26 YEARS OLD | 60 | 0.1:0.9 | 0.8 |
| 27 YEARS OLD | 70 | 0.1:0.9 | 0.8 |
| 28 YEARS OLD | 80 | 0.1:0.9 | 0.8 |
| 29 YEARS OLD | 90 | 0.1:0.9 | 0.8 |
| 30 YEARS OLD | 100 | 0.1:0.9 | 0.8 |
| 31 YEARS OLD | 200 | 0.1:0.9 | 0.8 |
| 32 YEARS OLD | 290 | 0.1:0.9 | 0.8 |
| 33 YEARS OLD | 380 | 0.1:0.9 | 0.8 |
| 34 YEARS OLD | 470 | 0.1:0.9 | 0.8 |
| 35 YEARS OLD | 560 | 0.24:0.76 | 0.52 |
| 36 YEARS OLD | 650 | 0.35:0.65 | 0.3 |
| 37 YEARS OLD | 740 | 0.42:0.58 | 0.16 |
| 38 YEARS OLD | 830 | 0.49:0.51 | 0.02 |
| 39 YEARS OLD | 920 | 0.53:0.47 | 0.06 |
| 40 YEARS OLD | 910 | 0.54:0.46 | 0.08 |
| 41 YEARS OLD | 900 | 0.54:0.46 | 0.08 |
| 42 YEARS OLD | 800 | 0.6:0.4 | 0.2 |
| 43 YEARS OLD | 700 | 0.67:0.33 | 0.34 |
| 44 YEARS OLD | 600 | 0.77:0.23 | 0.54 |

FIG. 15

| AGE | NUMBER OF INSTANCES IN NEIGHBORHOOD | OBJECTIVE VARIABLE DISTRIBUTION | IMPORTANCE DEGREE |
|---|---|---|---|
| 26 TO 30 YEARS OLD | 100 | 0.1:0.9 | 0.8 |
| 31 YEARS OLD | 200 | 0.1:0.9 | 0.8 |
| 32 YEARS OLD | 180 | 0.1:0.9 | 0.8 |
| 33 YEARS OLD | 160 | 0.1:0.9 | 0.8 |
| 34 YEARS OLD | 140 | 0.1:0.9 | 0.8 |
| 35 YEARS OLD | 120 | 0.1:0.9 | 0.8 |
| 36 TO 39 YEARS OLD | 100 | 0.1:0.9 | 0.8 |
| 40 TO 44 YEARS OLD | 100 | 0.9:0.1 | 0.8 |

FIG. 17

| AGE | YEAR | NUMBER OF INSTANCE | OBJECTIVE VARIABLE DISTRIBUTION | IMPORTANCE DEGREE |
|---|---|---|---|---|
| 20 YEARS OLD | YEAR 2000 | 10 | 0:1 | 1 |
| 20 YEARS OLD | YEAR 2001 | 10 | 0.6:0.4 | 0.2 |
| 20 YEARS OLD | YEAR 2002 | 80 | 0.2:0.8 | 0.6 |
| 30 YEARS OLD | YEAR 2000 | 10 | 0.4:0.6 | 0.2 |
| 30 YEARS OLD | YEAR 2001 | 10 | 1:0 | 1 |
| 30 YEARS OLD | YEAR 2002 | 80 | 0.8:0.2 | 0.6 |

FIG. 18

| | 20 YEARS OLD AND YEAR 2000 | 20 YEARS OLD AND YEAR 2001 | 20 YEARS OLD AND YEAR 2002 | 30 YEARS OLD AND YEAR 2000 | 30 YEARS OLD AND YEAR 2001 | 30 YEARS OLD AND YEAR 2002 |
|---|---|---|---|---|---|---|
| 20 YEARS OLD AND YEAR 2000 | 0 | 0.5 | 1 | 1 | 1.12 | 1.41 |
| 20 YEARS OLD AND YEAR 2001 | 0.5 | 0 | 0.5 | 1.12 | 1 | 1.12 |
| 20 YEARS OLD AND YEAR 2002 | 1 | 0.5 | 0 | 2 | 1.12 | 1 |
| 30 YEARS OLD AND YEAR 2000 | 1 | 1.12 | 1.41 | 0 | 0.5 | 1 |
| 30 YEARS OLD AND YEAR 2001 | 1.12 | 1 | 1.12 | 0.5 | 0 | 0.5 |
| 30 YEARS OLD AND YEAR 2002 | 1.41 | 1.12 | 1 | 1 | 0.5 | 0 |

| AGE | YEAR | NUMBER OF INSTANCE | OBJECTIVE VARIABLE DISTRIBUTION | IMPORTANCE DEGREE |
|---|---|---|---|---|
| 20 YEARS OLD | YEAR 2000 | 20 | 0.3:0.7 | 0.4 |
| 20 YEARS OLD | YEAR 2001 | 100 | 0.22:0.78 | 0.56 |
| 20 YEARS OLD | YEAR 2002 | 80 | 0.2:0.8 | 0.6 |
| 30 YEARS OLD | YEAR 2000 | 20 | 0.7:0.3 | 0.4 |
| 30 YEARS OLD | YEAR 2001 | 100 | 0.78:0.22 | 0.56 |
| 30 YEARS OLD | YEAR 2002 | 80 | 0.8:0.2 | 0.6 |

IMPORTANCE DEGREE CALCULATION PROGRAM, IMPORTANCE DEGREE CALCULATION METHOD, AND IMPORTANCE DEGREE CALCULATION APPARATUS

BACKGROUND OF THE INVENTION

1. Field of the Invention

The present invention relates to an importance degree calculation program, an importance degree calculation method, and an importance degree calculation apparatus for calculating an importance degree used in Memory-based Reasoning (MBR).

Definitions of the terms used in this specification are as follows.

"Variable" means type of information such as age or gender.

"Category value" means a value represented by a character string such as "man", "woman". There is no order relationship between category values.

"Category value variable" means a variable whose value is the category value.

"Numeric variable" means a variable whose value is a numeric value such as age. There is an order relationship between values of the numeric variable.

"Objective variable" means the category value variable serving as a criterion for calculation of an importance degree (to be described later).

"Objective variable value" means a value of the objective variable.

"Objective variable distribution" means the frequency distribution of the objective variable. The total of all objective variable value distributions becomes 1.

"Explanatory variable" means a variable other than the objective variable, which serves as a calculation target in calculation of an importance degree (to be described later).

"Explanatory variable value" means a value of the explanatory variable.

"Instance" means a set of a plurality of explanatory variable values and one objective variable value.

"Instance set" means a set including a plurality of instances.

"Section" means a given range obtained by dividing the explanatory variable. In the case where "age" is used as an explanatory variable, the section indicates, e.g., a range from 20 to 29 years old.

"Importance degree" means importance of a given section of the explanatory variable in the instance set.

Importance degree is calculated with the objective variable as a criterion. For example, the instance set having two instances each including three explanatory variables of "gender", "age", and "annual income" and one objective variable of "buying history" is represented as follows.

| Gender | Age | Annual income | Buying history |
|---|---|---|---|
| Man | 30 | 3 million | Presence |
| Woman | 20 | 4 million | Absence |

2. Description of the Related Art

In recent years, it has become possible to easily store a tremendous amount of information along with development of networks including the Internet, increase in storage density, and improvement in performance and price-reduction of computer components. Accordingly, in a POS (Point Of Sale) system used in distribution industry, it has become possible to collect sales record of branch shops around the nation in a computer system in the central office, and data related to relationship between time and sold goods are stored every second.

Also in other fields, a tremendous amount of information are stored and utilized, such as data indicating relationship between condition of various manufacturing equipment and yield of commodities produced in manufacturing industry, data of customer's credit card usage in finance industry, private data and contract state of insurance contractors in insurance industry. Further, there is an increasing demand that the stored data are used to improve business efficiency.

To calculate which value (section) of which variable is important among a large number of variables is often required in data analysis. The value indicating the importance is called importance degree.

Importance degree is used in an MBR as disclosed in, e.g., Patent Document 1: Jpn. Pat. Appln. Laid-Open Publication No. 2005-302054. The MBR extracts a plurality of instances close in terms of distance to an instance (unknown instance) whose objective variable is unknown from an instance set whose objective variable is known and estimates the objective variable of the unknown instance by a majority among the plurality of instances. At this time, the importance degree is used for calculation of a distance between instances, and emphasis is placed on the explanatory variable having a higher importance degree to increase accuracy in the estimation. Therefore, in order to make highly accurate estimation in the MBR, it is important to accurately calculate the importance degree (refer to Patent Document 1).

As a method for calculating the importance degree of a given value (explanatory variable value or section indicating a given range of e.g., age in the case of a numeric explanatory variable) of a given attribute (explanatory variable), there is a method of calculating the importance degree from the frequency distribution (objective variable distribution) of another given category value variable (objective variable) in an explanatory variable value. For example, as a weight calculation method disclosed in the Patent Document 1, a method of calculating the importance degree based on a difference between an objective variable distribution in an explanatory variable value and the entire objective variable distribution using the following equation (1) is known.

$$q_v(c) = p(c|v)/p(c)$$

$$W_j(v) = \Sigma |q_v(c)/\Sigma q_v(d) - 1/Nc|/(2 - 2/Nc) \qquad (1)$$

In the above equation, Nc is the number of types of objective variable values in an instance set, p(c|v) is the distribution of an objective variable value c in a j-th section vj in an explanatory variable, and p(c) is the distribution of an objective variable value c in the entire instance set. Incidentally, Σ denotes summation over all c or summation all over d.

At this time, it is necessary to accurately calculate the objective variable distribution in a given explanatory variable value in order to accurately calculate the importance degree.

For obtaining the importance degree of an explanatory variable value, a conventional method comprises the following steps: previously dividing an explanatory variable into a plurality of sections; calculating the objective variable distribution in each section; and using the calculated distributions without change to calculate the objective variable distribution.

In this method, however, when the explanatory variable is finely divided, the frequency in each section becomes lower to decrease reliability of the target objective variable distribution, with the result that an error is likely to occur. When, conversely, the explanatory variable is coarsely divided, it becomes impossible to follow a change in the real objective variable distribution, causing difference between calculated distribution and real distribution. FIG. 20 shows an example in which an explanatory variable is coarsely divided so as not to cause an error. As can be seen from FIG. 20, a large difference is observed between the calculated objective variable distribution and a real distribution at the central portion.

If the frequency used in calculation of the objective variable distribution is made higher, it is possible to increase reliability of the objective variable distribution and to reduce an error. Accordingly, a method of calculating the objective variable distribution by using a moving average can be considered.

However, the average width stays constant in a conventional method, so that a problem occurs when the frequency of the explanatory variable drastically changes. More specifically, in a low density part, the frequency of the average width becomes low to decrease reliability of calculated objective variable distribution, so that an error is likely to occur in the importance degree obtained by using the calculated objective variable distribution. On the other hand, in a high density part, calculation of the objective variable distribution is made beyond the required frequency (i.e., including unnecessary part), so that a difference is caused between the calculated objective variable distribution and a real distribution.

FIG. 21 shows an example in which the average width is set wide so that objective variable distribution having higher reliability can be obtained even in a low frequency part. As can be seen from FIG. 21, a large difference is observed between the obtained objective variable distribution and a real distribution in the central part.

As described above, it has been difficult with a conventional method to obtain an objective variable distribution (i.e., importance degree) which is based on fine sections and less subject to an error in an explanatory variable in which frequency drastically changes.

SUMMARY OF THE INVENTION

The present invention has been made to solve the above problem, and an object thereof is to provide an importance degree calculation program, an importance degree calculation apparatus, and an importance degree calculation method capable of obtaining an objective variable distribution having high reliability irrespective of the section size in an explanatory variable in which frequency drastically changes.

To solve the above problem, according to a first aspect of the present invention, there is provided an importance degree calculation program allowing a computer to calculate importance degree from an instance set and an explanatory variable, comprising: a section generation step that receives, as an input, an instance set and an explanatory variable and uses the instance set to divide the explanatory variable into a plurality of sections to obtain a section set; a neighborhood instance set extraction step that uses the instance set, the section set obtained by the section generation step, and a neighborhood instance number threshold to extract from across all sections a neighborhood instance set of each section in which the number of instances is greater than the neighborhood instance number threshold; an objective variable distribution calculation step that calculates an objective variable distribution from the neighborhood instance set of each section extracted by the neighborhood instance set extraction step; and an importance degree calculation step that calculates importance degree of each section from the objective variable distribution in each section obtained by the objective variable distribution calculation step and instance set.

In the importance degree calculation program according to the present invention, the neighborhood instance set extraction step comprises: a neighborhood section set extraction step that uses the instance set, section set, and neighborhood instance number threshold to output a neighborhood section set of each section in which the sum of instances exceeds the neighborhood instance number threshold; and a neighborhood instance set output step that outputs, as a neighborhood instance set, an instance set included in the neighborhood section set of each section obtained by the neighborhood section set extraction step.

In the importance degree calculation program according to the present invention, in the case where a category value variable is specified as an explanatory variable and a distance between category values is used, the section generation step outputs respective category values existing in the explanatory variable as a section, and the neighborhood instance set extraction step uses the sections generated by the section generation step and distance between category values to extract neighborhood instances in the ascending order in terms of the distance between category values.

In the importance degree calculation program according to the present invention, in the case where a category value variable is specified as an explanatory variable and a distance between category values is used, the section generation step outputs respective category values existing in the explanatory variable as a section, and the neighborhood section set extraction step uses the sections generated by the section generation step and distance between categories to extract neighborhood sections in the ascending order in terms of the distance between category values.

In the importance degree calculation program according to the present invention, in the case where a plurality of explanatory variables are used, the section generation step outputs a section set in which each section is constituted by a combination of sections of respective explanatory variables.

In the importance degree calculation program according to the present invention, in the case where a variable representing time is included in the plurality of explanatory variables, the section generation step outputs a section set in which sections are arranged in time-series.

The importance degree calculation program according to the present invention comprises: a neighborhood instance number threshold input step that inputs a neighborhood instance number threshold; and an importance degree list display step that displays a list of calculated importance degrees, wherein the neighborhood instance number threshold input step and importance degree list display step are alternately repeated based on the user's determination.

The importance degree calculation program according to the present invention comprises a neighborhood instance number threshold calculation step that uses an instance set and a neighborhood ratio threshold to output the product of the number of instances in the instance set and neighborhood ratio threshold as the instance number threshold.

The importance degree calculation program according to the present invention comprises: a neighborhood ratio threshold input step that inputs a neighborhood ratio threshold; and an importance degree list display step that displays a list of importance degrees, wherein the neighborhood ratio threshold input step and importance degree list display step are alternately repeated based on the user's determination.

In the importance degree calculation program according to the present invention, the objective variable distribution calculation step calculates a distance between each instance in a neighborhood instance set and a section serving as a criterion and uses a weight which increases as the distance decreases to calculate an objective variable distribution.

Further, according to a second aspect of the present invention, there is provided an importance degree calculation apparatus, comprising: a section generation section that receives, as an input, an instance set and an explanatory variable and uses the instance set to divide the explanatory variable into a plurality of sections to obtain a section set; a neighborhood instance set extraction section that receives, as an input, the instance set, the section set obtained by the section generation section, and a neighborhood instance number threshold to extract from across all sections a neighborhood instance set of each section in which the number of instances is greater than the neighborhood instance number threshold; an objective variable distribution calculation section that calculates an objective variable distribution from the neighborhood instance set of each section extracted by the neighborhood instance set extraction section; and an importance degree calculation section that calculates importance degree of each section from the objective variable distribution in each section obtained by the objective variable distribution calculation section and instance set.

In the importance degree calculation apparatus according to the present invention, the neighborhood instance set extraction section comprises: a neighborhood section set extraction section that receives, as an input, the instance set, section set, and neighborhood instance number threshold to output a neighborhood section set of each section in which the sum of instances exceeds the neighborhood instance number threshold; and a neighborhood instance set output section that outputs, as a neighborhood instance set, an instance set included in the neighborhood section set of each section obtained by the neighborhood section set extraction section.

In the importance degree calculation apparatus according to the present invention, in the case where a category value variable is input as an explanatory variable, the section generation section outputs respective category values existing in the explanatory variable as a section, and the neighborhood instance set extraction section uses the sections generated by the section generation section and distance between category values to extract neighborhood instances in the ascending order in terms of the distance between category values.

The importance degree calculation apparatus according to the present invention comprises a neighborhood instance number threshold calculation section that receives, as an input, an instance set and a neighborhood ratio threshold to output the product of the number of instances in the instance set and neighborhood ratio threshold as the instance number threshold.

Further, according to a third aspect of the present invention, there is provided an importance degree calculation method that calculates importance degree from an instance set and an explanatory variable. The method is executed by a computer. The method comprises: a section generation step that receives, as an input, an instance set and an explanatory variable and uses the instance set to divide the explanatory variable into a plurality of sections to obtain a section set; a neighborhood instance set extraction step that uses the instance set, the section set obtained by the section generation step, and a neighborhood instance number threshold to extract from across all sections a neighborhood instance set of each section in which the number of instances is greater than the neighborhood instance number threshold; an objective variable distribution calculation step that calculates an objective variable distribution from the neighborhood instance set of each section extracted by the neighborhood instance set extraction step; and an importance degree calculation step that calculates importance degree of each section from the objective variable distribution in each section obtained by the objective variable distribution calculation step and instance set.

According to the present invention, it is possible to calculate objective variable distribution having high reliability irrespective of the section size in an explanatory variable in which frequency drastically changes to thereby obtain highly reliable importance degree.

BRIEF DESCRIPTION OF THE DRAWINGS

FIG. 12 is a view showing an example of an instance set;

FIG. 13 is a view showing a calculation result obtained according to a conventional method (sectioning);

FIG. 14 is a view showing a calculation result obtained according to a conventional method (moving average);

FIG. 15 is a calculation result obtained according to the present embodiment;

FIG. 17 is a view showing an example of an instance set for time-series data;

FIG. 18 is a view showing a distance between sections calculated according to the present embodiment;

DETAILED DESCRIPTION OF THE PREFERRED EMBODIMENT

An embodiment of the present invention will be described below with reference to the accompanying drawings.

(1: Basic Configuration)

Figure 1:
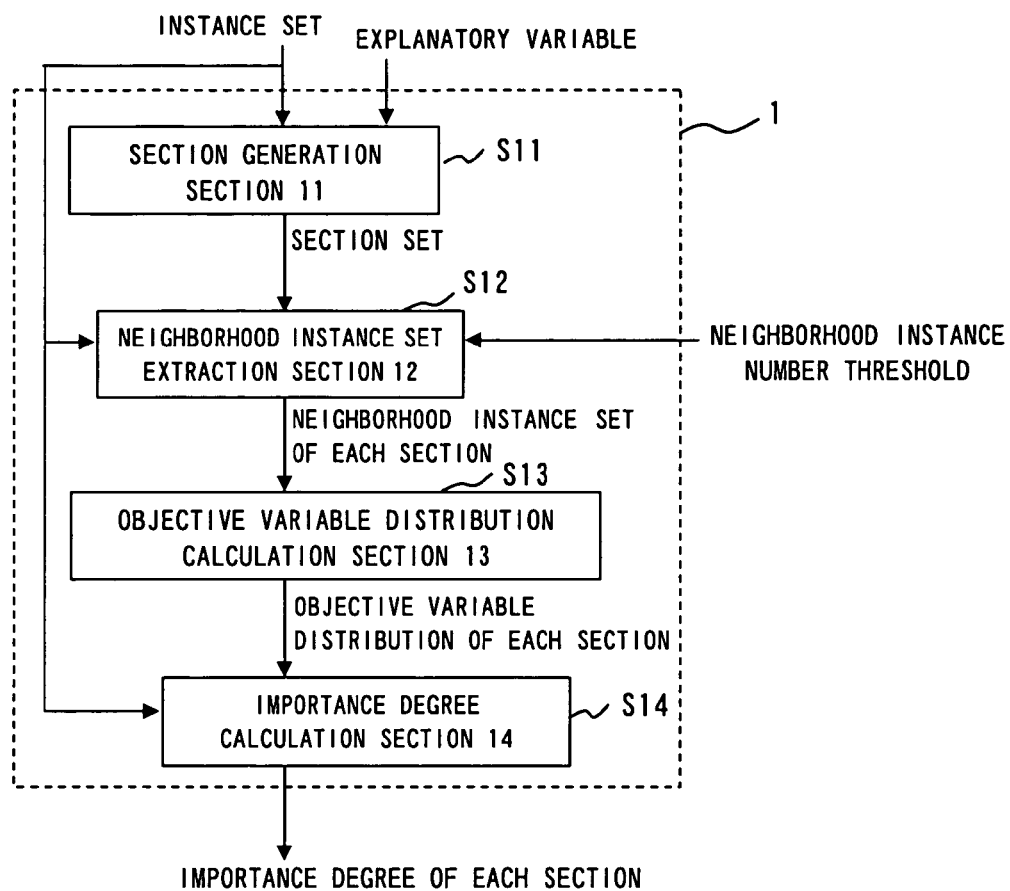
FIG. 1 is a block diagram showing a basic configuration of an embodiment of the present invention.

FIG. 1 is a block diagram showing a basic configuration of an embodiment of the present invention. An importance degree calculation apparatus 1 according to the present embodiment includes a section generation section 11, a neighborhood instance set extraction section 12, an objective variable distribution calculation section 13, and an importance degree calculation section 14. In FIG. 1, operations of the respective sections 11 to 14 correspond to steps (steps S11 to S14) necessary to perform operations of the present invention.

Basic operation of the present embodiment will be described below. The section generation section 11 receives, as an input, an instance set and an explanatory variable and divides the explanatory variable into fine sections (step S11). The neighborhood instance set extraction section 12 receives, as an input, the instance set, section set, and a threshold of the number of neighborhood instances and extracts, across all sections, a neighborhood instance set of each section in which the number of instances is greater than the neighborhood instance number threshold irrespective of the size of each explanatory variable section obtained by the section generation section 11 (step S12).

The objective variable distribution calculation section 13 calculates an objective variable distribution based on the neighborhood instance set of each section (step S13). The importance degree calculation section 14 calculates an importance degree of each section based on the objective variable distribution of each section and input instance set (step S14).

In the case where a numeric explanatory variable in which an explanatory variable is a numeric value is given as an input, the section generation section 11 can use, e.g., a method of equally dividing the explanatory variable range (from the maximum value to minimum value) into a large number (e.g., 1,000) of sections.

In order to obtain a neighborhood instance set of each section in which the number of instances is greater than the neighborhood instance number threshold, the neighborhood instance set extraction section 12 calculates the average value (average number of instances included in each section) of the explanatory variables in each section, extracts instances the number of which corresponds to an upper "neighborhood instance number threshold" near the average value, and sets a set of the extracted instances as the neighborhood instance set.

The neighborhood instance number threshold is specified by a user. Examples of the method for specifying the neighborhood instance number threshold include the followings.

(1) Specify a sufficiently large number (e.g., 1,000).

(2) Make a specification such that the expectation value of the frequency of an objective variable value having the least frequency among objective variable values in a neighborhood instance set becomes about 10. For example, assuming that there are two objective variable values of o and x and that the frequency ratio thereof is 1:999, 10,000 is set as a neighborhood instance number threshold so that the expectation value of the frequency of o in the neighborhood instance set becomes 10.

(3) Use the larger one of two values obtained according to the above specifying methods (1) and (2).

Figure 2:
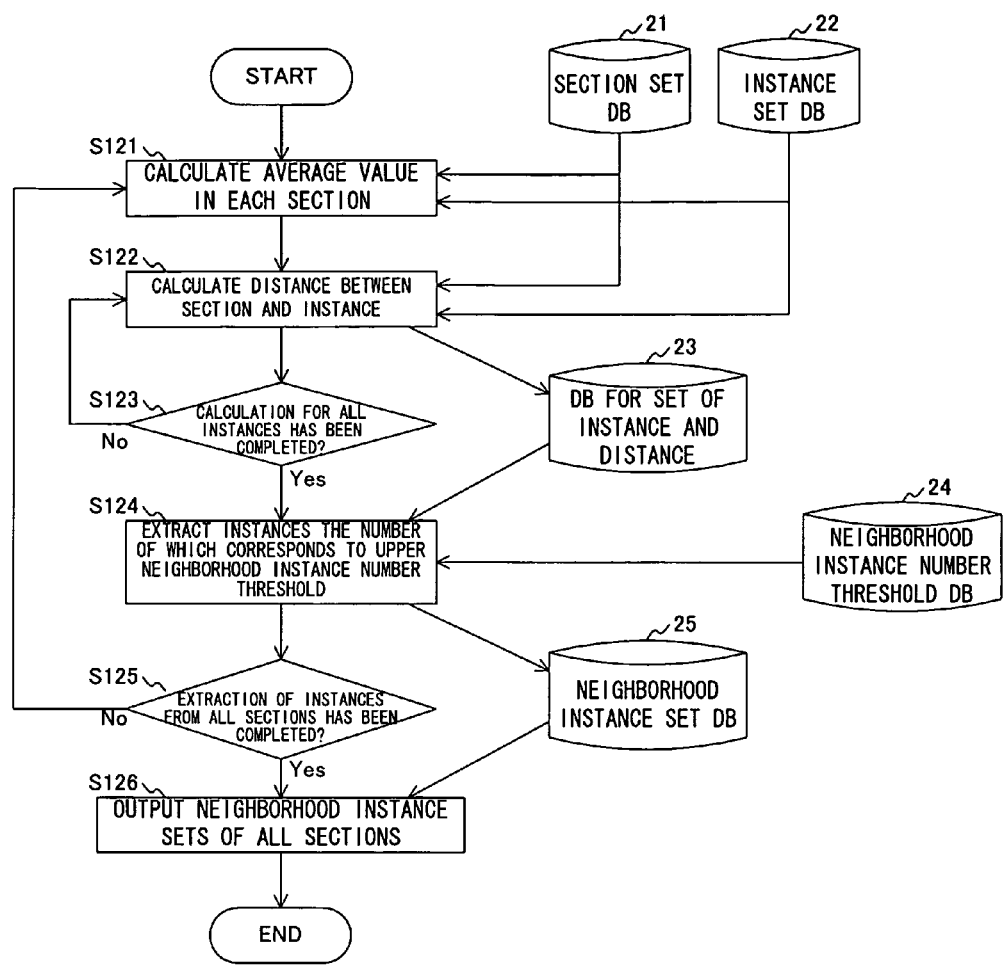
FIG. 2 shows a flowchart showing operation of a neighborhood instance set extraction section 12.

FIG. 2 shows a flowchart showing detailed operation of the neighborhood instance set extraction section 12. Firstly, the neighborhood instance set extraction section 12 acquires a section set and an instance set respectively from a section set database 21 and an instance set database 22 and calculates an average value (average number of instances) in each section (step S121). The neighborhood instance set extraction section 12 then calculates a distance between each section and instance (step S122) and performs the calculation for all instances (steps S122 and S123). Results of the distance calculation are stored in a database 23 for set of instance and distance.

The neighborhood instance set extraction section 12 then extracts instances the number of which corresponds to an upper neighborhood instance number threshold based on the set of instance and distance in the database 23 and neighborhood instance number threshold in a neighborhood instance number threshold database 24 (step S124). The extraction result is stored in a neighborhood instance set database 25. When the above instance extraction processing has been completed for all sections (Yes in step S125), sets of neighborhood instances of all sections are output from the stored results (step S126).

As described above, the neighborhood instance set extraction section 12 extracts, across all sections, a neighborhood instance set of each section in which the number of instances is greater than the neighborhood instance number threshold irrespective of the size of each explanatory variable section to thereby obtain sets of neighborhood instances. By calculating an importance degree of each section based on the obtained sets of neighborhood instances, it is possible to increase reliability of an objective variable distribution obtained by the objective variable distribution calculation section 13 (the details will be described later) irrespective of the section size. As a result, the importance degree becomes less subject to an error in objective variable distribution, thereby increasing reliability of the importance degree.

The objective variable distribution calculation section 13 calculates objective variable distribution based on the neighborhood instance set of each section. For example, a distribution of a given objective variable value is obtained according to the following formula: "(the number of instances whose objective variable value fulfills a predetermined criterion in neighborhood instance set)/(the number of instances in neighborhood instance set)".

Figure 3:
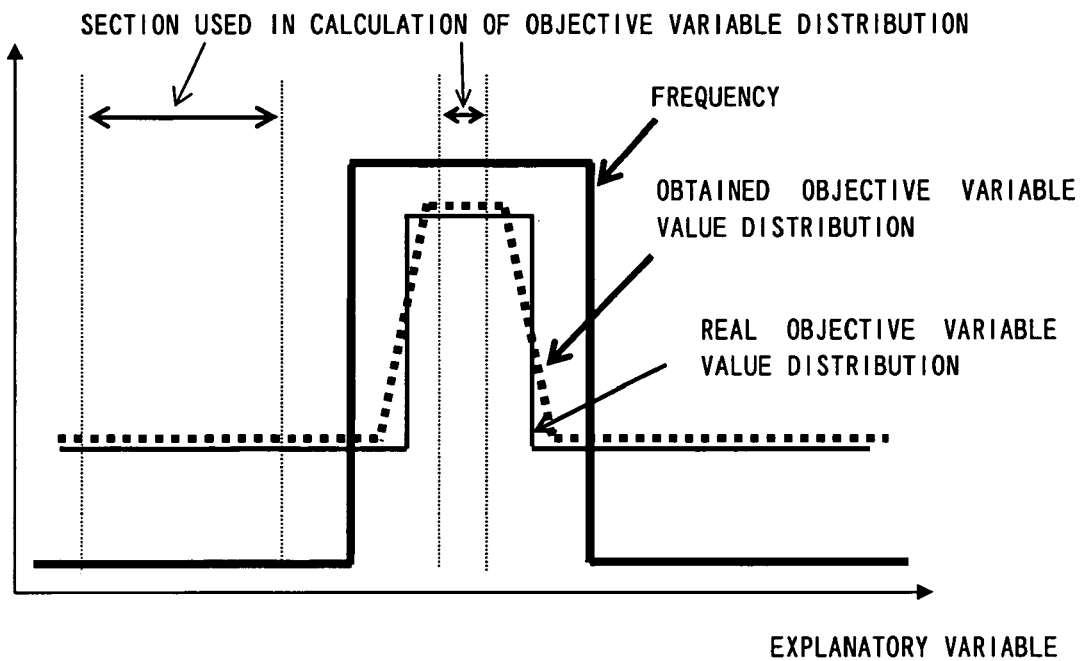
FIG. 3 shows an example of a frequency, a real objective variable distribution, and an objective variable distribution obtained in the present embodiment.

FIG. 3 shows an example of a frequency, a real objective variable distribution, and an obtained objective variable. As shown in FIG. 3, the obtained objective variable value distribution is extremely close to the real objective variable value distribution. This reveals that the importance degree calculation section 14 (the details of which will be described below) can obtain a highly reliable importance degree.

The importance degree calculation section 14 calculates an importance degree of each section based on an objective variable distribution and an instance set of each section. The importance degree is calculated based on a difference between the objective variable distribution in an explanatory variable value and entire objective variable distribution using the equation (1), as the weight calculation method disclosed in the abovementioned Patent Document 1.

(2: Another Configuration Example of Neighborhood Instance Set Extraction Section)

Figure 4:
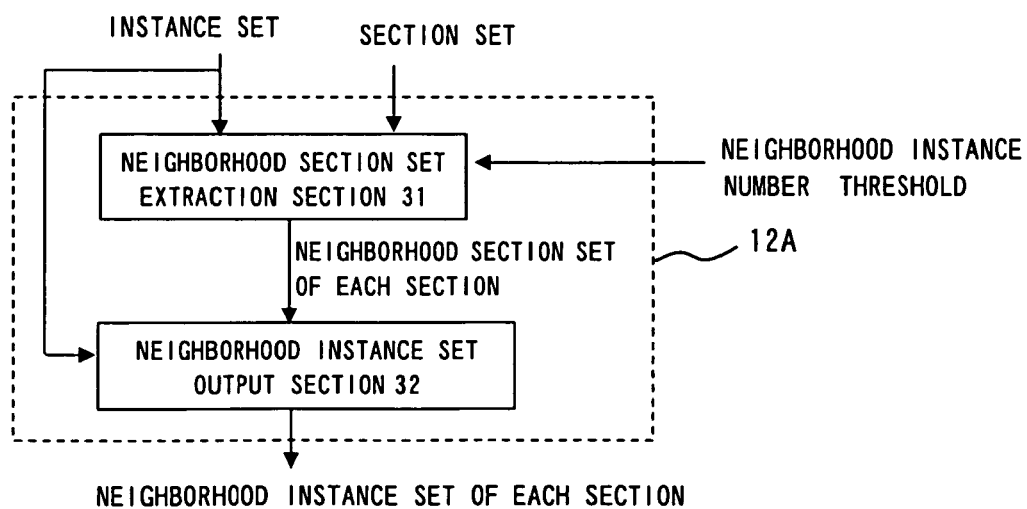
FIG. 4 is a block diagram showing another configuration example of the neighborhood instance set extraction section.

The configuration example of neighborhood instance set extraction section may be constituted by a neighborhood section set extraction section 31 and a neighborhood instance set output section 32, as shown in FIG. 4.

The neighborhood section set extraction section 31 receives, as an input, an instance set, a section set, and a neighborhood instance number threshold and outputs a neighborhood section set of each section in which the number of instances is greater than the neighborhood instance number threshold. For example, the following method is used in order to obtain a neighborhood set of a given section.

(Step 1) Calculate the number of instances in each section and average value (average number of instances included in each section) of the explanatory variables in section.

(Step 2) Extract sections in the ascending order in terms of a distance between the average values thereof until the sum of the instances included in each section exceeds a neighborhood instance number threshold.

(Step 3) Set the section set obtained in step 2 as a neighborhood section set of each section.

The neighborhood instance set output section 32 outputs an instance set included in the neighborhood set section of each section as a neighborhood instance set.

Figure 5:
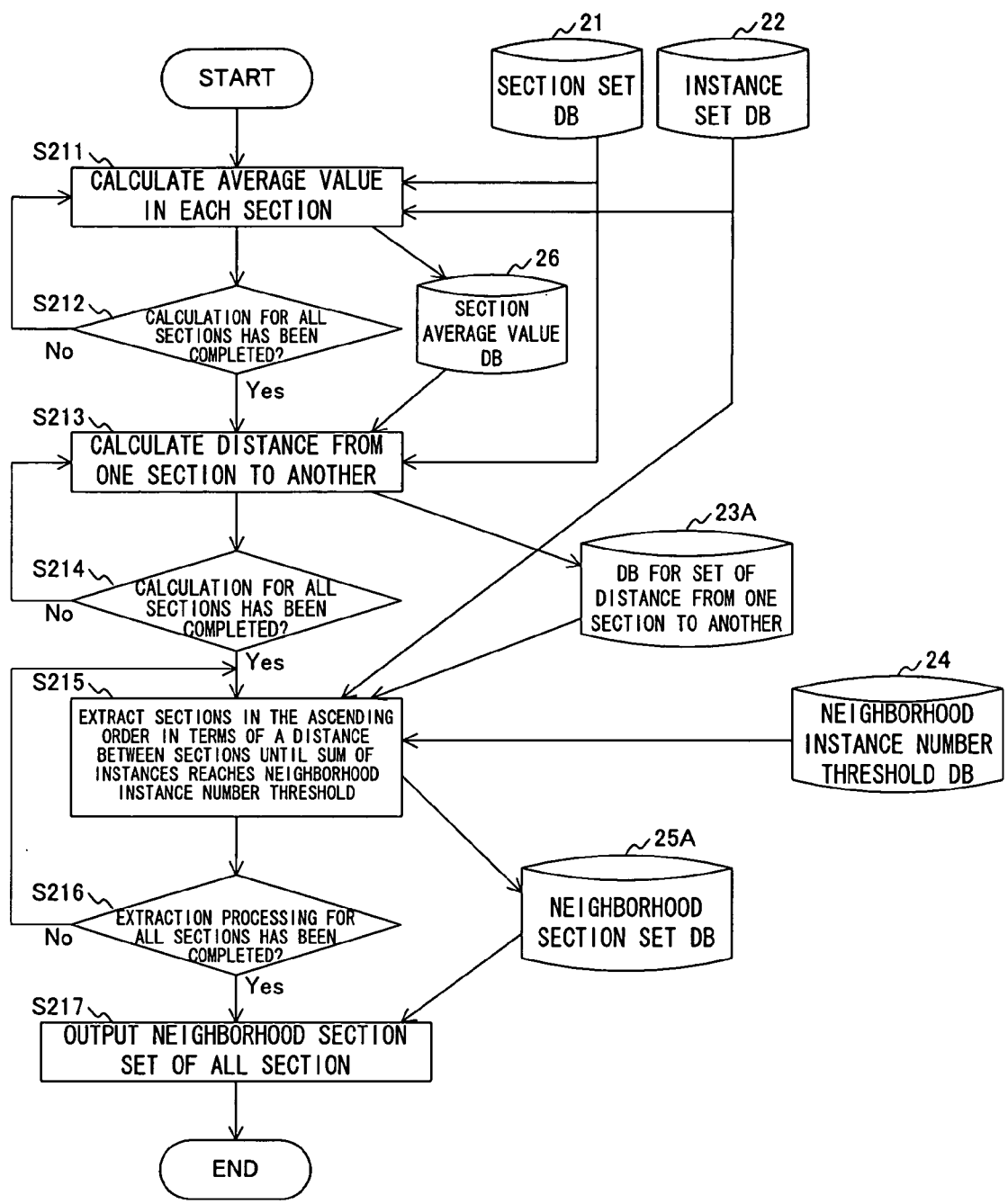
FIG. 5 shows a flowchart showing operation of a neighborhood section set extraction section 31.

FIG. 5 shows a flowchart showing operation of the neighborhood section set extraction section 31. The neighborhood section set extraction section 31 acquires a section set and an instance set respectively from the section set database 21 and instance set database 22 and calculates an average value in each section (steps S211 and S212). This calculation is performed for all sections. The average value in each section is stored in a section average value database 26. The neighborhood section set extraction section 31 then uses the average value in each section to calculate a distance from another section (step S213). This calculation is performed for all sections (Yes in step S214). The distance from one section to another is stored in the database 23A as an element of a set of distances from one section to another.

Then, the neighborhood section set extraction section 31 extracts sections in the ascending order in terms of a difference between sections until the sum of the instances included in each section reaches a neighborhood instance number threshold (step S215). The data from the databases 22, 23A, and 24, i.e., the instance set, set of distance from one section to another, and neighborhood instance number threshold are used in the extraction processing.

When the extraction processing for all sections has been completed (Yes in step S216), neighborhood section sets of all sections are output from the database 25A (step S217).

As described above, the neighborhood section set extraction section 31 extracts a neighborhood not by searching for a neighborhood of the instance set but by searching for a neighborhood of the section set. This reduces the number of extraction targets to enable higher speed operation than in the case of searching for a neighborhood of the instance set.

(3: Case Where Category Value Variable is Specified as Explanatory Variable)

Figure 6:
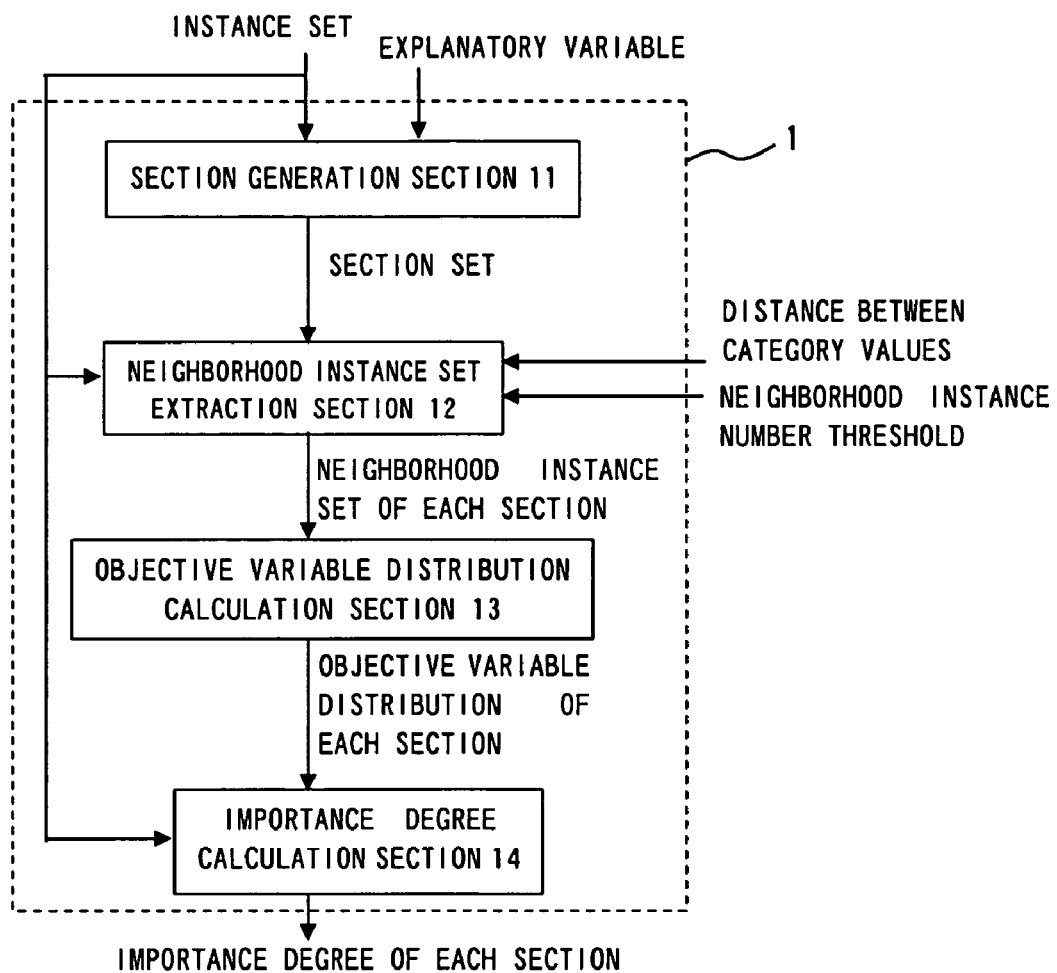
FIG. 6 is a block diagram showing a case where a category value variable is specified as an explanatory variable.

A case where a category value variable is specified as an explanatory value will next be described. FIG. 6 is a block diagram showing a case where a category value variable is specified as an explanatory variable.

In FIG. 6, the section generation section 11 outputs category values existing in an explanatory variable as a section as in the case of FIG. 1.

The neighborhood instance set extraction section 12 (neighborhood section set extraction section 31, in the case of FIG. 4) allows a user to input a distance between category values, extracts neighborhood instances (neighborhood section, in the case of FIG. 4) in the ascending order in terms of a distance between category values and outputs a neighborhood instance set (neighborhood section set, in the case of FIG. 4).

Assume that an explanatory variable "job type" has three values: "office worker", "part-time job", and "inoccupation", which have a frequency of 80, 10, and 10, respectively. In this case, the section generation section 11 outputs three sections set for "office worker", "part-time job", and "inoccupation". The neighborhood instance set extraction section 12 receives, as an input from a user, a neighborhood instance number threshold of "20" and distances between category values shown in the following table.

| (Explanatory variable 1) | (Explanatory variable 2) | Distance |
| --- | --- | --- |
| Office worker | Part-time job | 1 |
| Office worker | Inoccupation | 1 |
| Part-time job | Inoccupation | 0.5 |

In this case, the neighborhood instance set extraction section 12 outputs an instance set in which an explanatory variable is, "office worker" as a neighborhood instance set of "office worker". Further, since a distance between "part-time job" and "inoccupation" is smallest, the neighborhood instance set extraction section 12 outputs an instance set in which an explanatory variable is "part-time job" or "inoccupation" as a neighborhood instance set of "part-time job" and an instance set in which an explanatory variable is "part-time job" or "inoccupation" as a neighborhood instance set of "inoccupation".

(4: Case Where Plurality of Explanatory Variables (Explanatory Variable Group) are Specified)

A case where a plurality of explanatory variables (explanatory variable group) are specified will next be described.

In the following description, two explanatory variables of "age" and "annual income" are specified. Assume that "age" has two sections of "20 years old" and "30 years old" and "annual income" has three sections of "3 million", "4 million", and "5 million". Further, assume that each section has only one value, for the sake of simplification.

The section generation section 11 outputs a section set in which each section is constituted by a combination of sections of respective explanatory variables. In the above example, the section generation section 11 outputs a section set constituted by six sections of "20 years old and 3 million", "20 years old and 4 million", "20 years old and 5 million", "30 years old and 3 million", "30 years old and 4 million", and "30 years old and 5 million".

The neighborhood instance set extraction section 12 outputs a neighborhood instance set of each section in which the number of instances is greater than the neighborhood instance number threshold. For example, the neighborhood instance set extraction section 12 uses the following equations (equations (2A and 2B)) to define a distance between a given section and instance and extracts neighborhood instance sets in the ascending order in terms of distance between them.

$$\text{Distance between section } x \text{ and instance } y = [\Sigma\{(\text{average value of section } x \text{ of i-th explanatory variable} - \text{value of i-th explanatory variable of instance } y)/(\text{maximum value of i-th explanatory variable} - \text{minimum value of i-th explanatory variable})\}^2]^{1/2} \quad (2A)$$

In the above calculation, the addition is made for (i=1 to the number corresponding to explanatory variables). In a similar way, a distance between sections can also be calculated using the following equation.

A distance between section $x$ and section $y$ = $[\Sigma\{(\text{average value of section } x \text{ of i-th explanatory variable} - \text{average value of section } y)/(\text{maximum value of i-th explanatory variable} - \text{minimum value of i-th explanatory variable})\}^2]^{1/2}$ (2B)

In the above calculation, the addition is made for (i=1 to the number corresponding to explanatory variables).

Figures 7, 8:
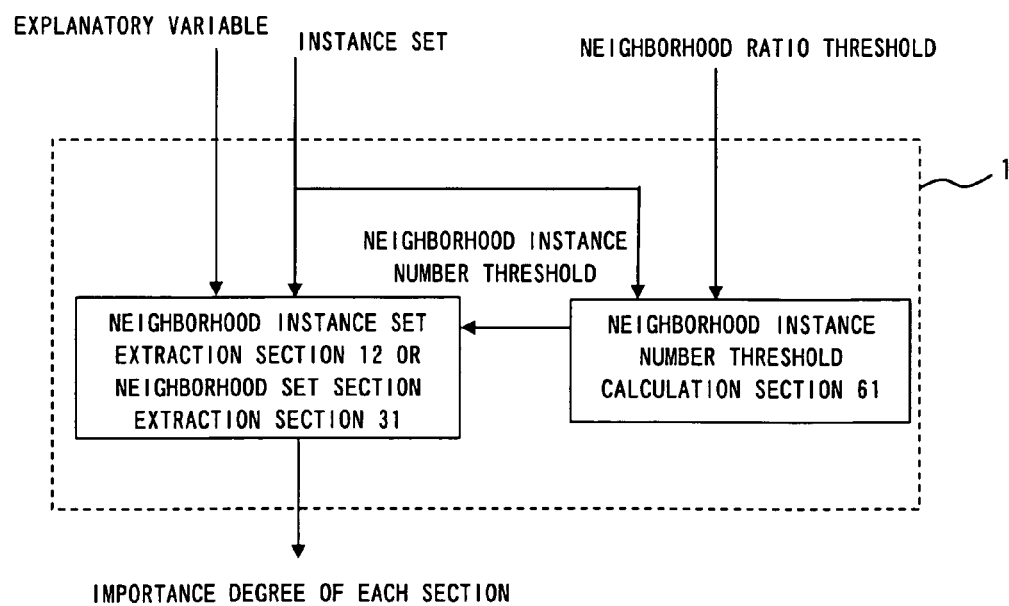
FIG. 7 is a table showing an example of a distance between each section and instance.
FIG. 8 is a block diagram showing a neighborhood instance number threshold calculation section.

In the above example, a distance between each section and instance is represented as a table shown in FIG. 7. By extracting instances in the ascending order in terms of a distance between them according to the table, a neighborhood instance set of each section can be extracted.

Operations of the objective variable distribution calculation section 13 and importance degree calculation section 14 are same as those describe above, and the description thereof is omitted here.

(5: Case Where a Variable Representing "Time" is Specified as One Explanatory Variable in an Explanatory Variable Group)

A case where calculation of importance degree is made for time-series data will next be described. This calculation is made by specifying a variable representing "time" as one explanatory variable in an explanatory variable group in the case where a plurality of explanatory variables are specified.

In the following description, two explanatory variables of "year" and "age" are specified. Assume that "age" has two sections of "20 years old" and "30 years old" and "year" has three sections of "year 1995", "year 2000", and "year 2005". Although it is assumed that each section has only one value here for the sake of simplification, it goes without saying that each section may have two or more values.

The processing performed in the respective sections are same as those described in the above embodiment. In the above example, the importance degree can be calculated for six sections of "year 1995 and 20 years old", "year 2000 and 20 years old", "year 2005 and 20 years old", "year 1995 and 30 years old", "year 2000 and 30 years old", and "year 2005 and 30 years old". As a result, a temporal variation in the importance degree of "20 years old" and "30 years old" from "year 1995" to "year 2005" can be grasped.

(6: Calculation of Neighborhood Instance Number Threshold)

A description will be given of the neighborhood instance number threshold calculation section which calculates a neighborhood instance member threshold value and outputs it to the neighborhood instance set extraction section 12 (neighborhood section set extraction section 31, in the case of FIG. 4) with reference to FIG. 8.

Figure 9:
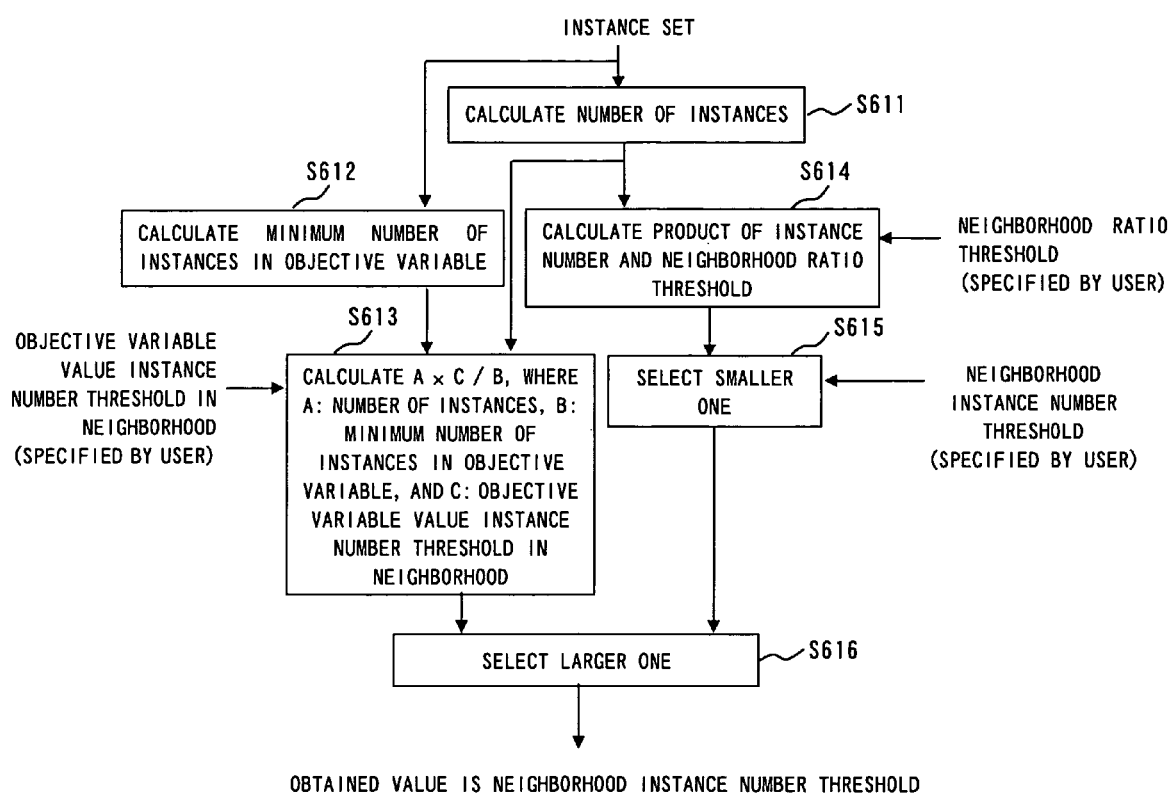
FIG. 9 is a flowchart showing operation of the neighborhood instance number threshold calculation section.

A flowchart of FIG. 9 shows operation of the neighborhood instance number threshold calculation section 61. The neighborhood instance number threshold calculation section 61 calculates the number of instances in an instance set (step S611), calculates the minimum number of instances in objective variable (step S612), and calculates the following formula (step S613).

[Number of instances: A]×[Objective variable value instance number threshold in neighborhood: C]/ [Minimum number of instances in objective variable: B] (3)

At the same time, the neighborhood instance number threshold calculation section 61 calculates the product of the number of instances and a neighborhood ratio threshold based on the calculated instance number (step S614) and selects a smaller one of the product and neighborhood instance number threshold (step S615). Then, the neighborhood instance number threshold calculation section 61 selects a larger one of the selected value and a value obtained according to (formula (3)) (step S616) and sets a selected one as a neighborhood instance number threshold.

As described above, neighborhood instance number threshold calculation section 61 receives, as an input, an instance set and a neighborhood ratio threshold and outputs the product of the number of instances in the instance set and neighborhood ratio threshold as a neighborhood instance number threshold. For example, a user specifies, e.g., 0.1 as a neighborhood ratio threshold. Thus, it is possible for the user to easily specify the neighborhood instance number threshold without taking consideration of the number of instances in an instance set.

(7: Calculation of Objective Variable Distribution)

An example of operation of the objective variable distribution calculation section 13 will next be described. The objective variable distribution calculation section 13 calculates a distance between each instance in the neighborhood instance set and a section serving as a criterion and uses a weight which increases as the distance decreases to calculate an objective variable distribution.

The distance between each instance in the neighborhood instance set and section serving as a criterion can be obtained using a distance calculation method (equations 2A and 2B) which has been described in (4: Case where plurality of explanatory variables (explanatory variable group) are specified) (the same calculation method can be used even in the case where the number of explanatory variables is 1).

Assuming that a distance between i-th section and j-th neighborhood instance is d (i,j), objective variable distribution p(i,c) of objective variable value c in i-th section can be calculated using the following (equation (4)).

$p(i,c) = \Sigma(1/(1+d(i,j)))/\Sigma(1/(1+d(i,j)))$ (4)

In the above calculation, addition in the numerator is performed for j with respect to neighborhood instances in which an objective variable value is c, and addition in the denominator is performed for j with respect to all neighborhood instances.

Using the above method, it is possible to attach greater importance to closer neighborhood instances and thereby to obtain a highly accurate objective variable distribution.

(8: Neighborhood Instance Number Threshold (Neighborhood Ratio Threshold))

Figure 10:
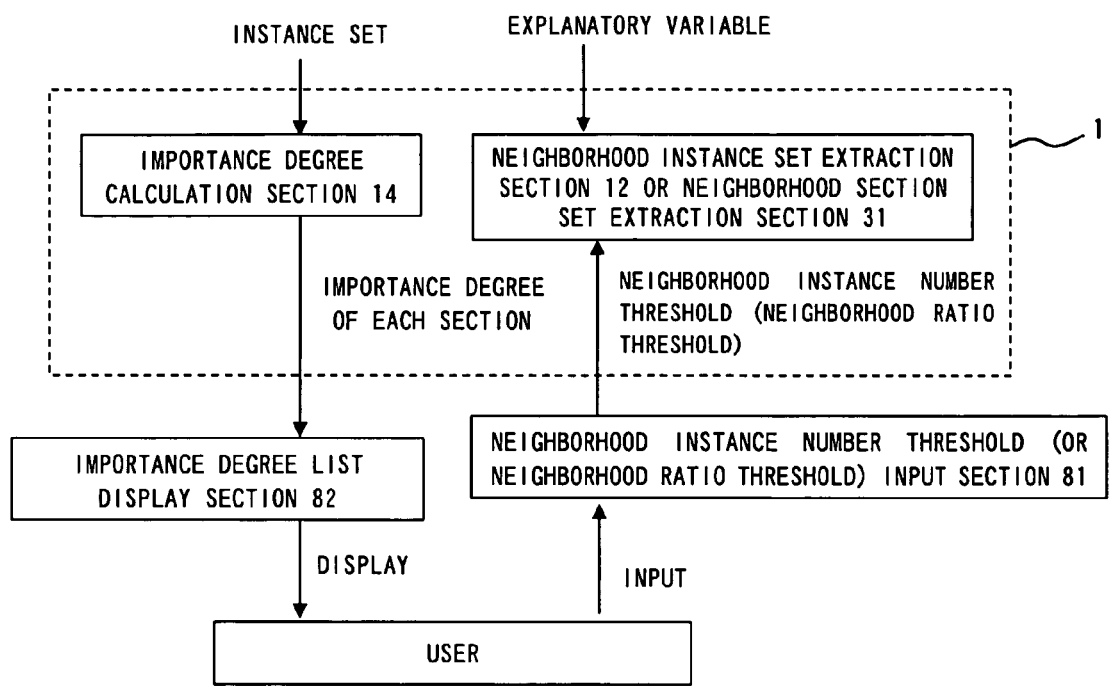
FIG. 10 is a block diagram showing a neighborhood instance number threshold (or neighborhood ratio threshold) input section.
Figure 11:
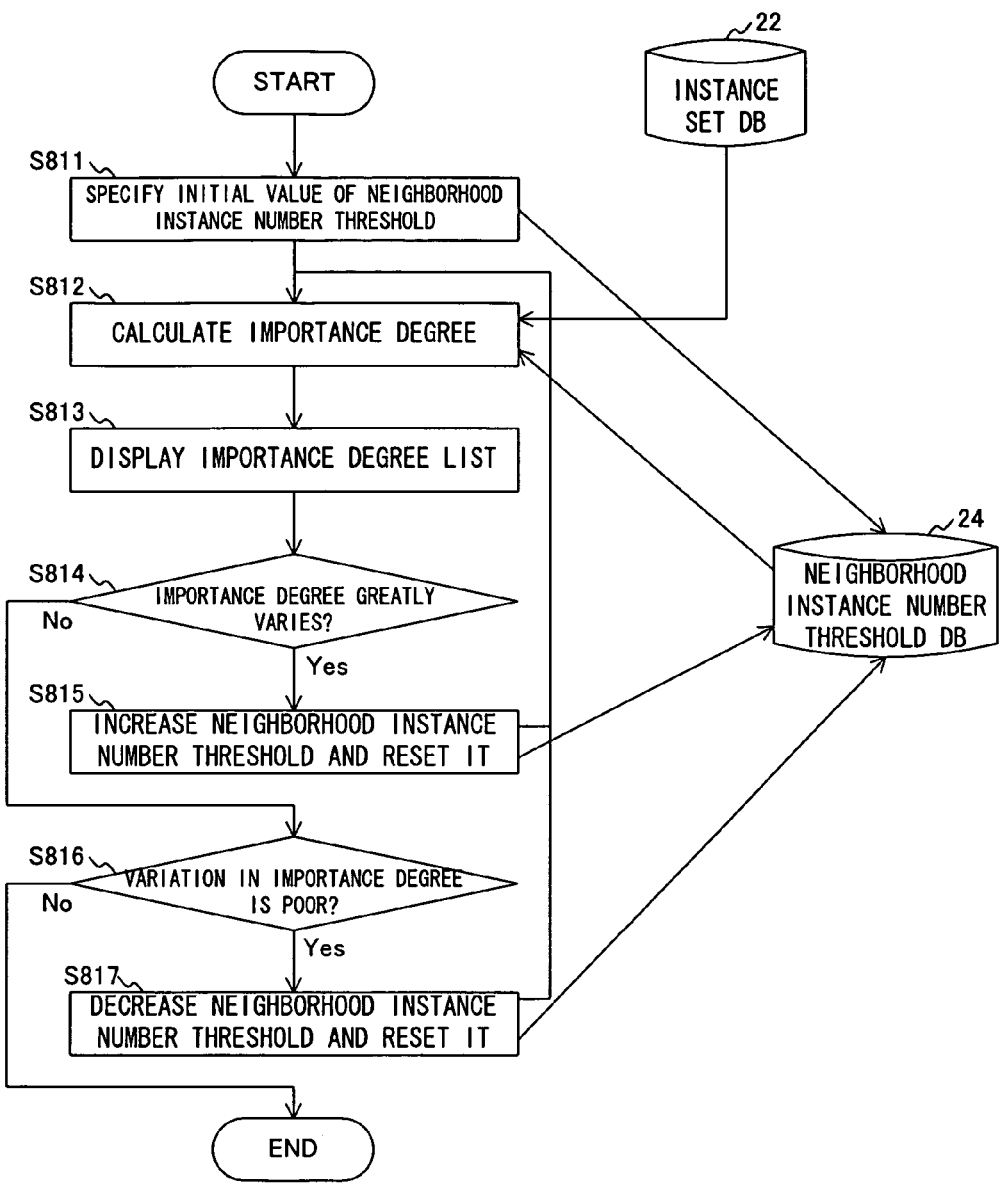
FIG. 11 is a flowchart showing a determination flow of a neighborhood instance number threshold (neighborhood ratio threshold)

A case where a neighborhood instance number threshold is input not through the abovementioned neighborhood instance number threshold calculation section 61 but directly input by a user will next be described with reference to FIGS. 10 and 11. A neighborhood instance number threshold (or neighborhood ratio threshold) input section 81 allows a user to input a neighborhood instance number threshold (neighborhood ratio threshold) and presents a result obtained by calculation based on the input value to the user. The user can change the presented neighborhood instance number threshold (neighborhood ratio value) according to need.

In this case, an importance degree list display section 82 displays a list of importance degrees output from the importance degree calculation section 14 to the user and prompts the user to determine whether he or she changes the input neighborhood instance number threshold (neighborhood ratio threshold).

That is, the user confirms the list of importance degrees and, when determining that importance degree varies greatly due to the influence of an error, increases the neighborhood instance number threshold (neighborhood ratio threshold) to be set. In contrast, when determining a variation in importance degree is poor and a neighborhood size is too large, the user decreases the neighborhood instance number threshold (neighborhood ratio threshold) to be set. After repetition of the above specification of the neighborhood instance number threshold (neighborhood ratio threshold) by the user and presentation of a list of importance degrees, the user inputs an adequate neighborhood instance number threshold (neighborhood ratio threshold), allowing an adequate influence level to be output.

In the above case, if the determination made by the user is previously set as a predetermined value in the apparatus, it is possible to automatically set the neighborhood instance number threshold (neighborhood ratio threshold).

Operation of the neighborhood instance number threshold (or neighborhood ratio threshold) input section 81 configured to automatically set the neighborhood instance number threshold (neighborhood ratio threshold) will next be described with reference to a flowchart shown in FIG. 11.

The neighborhood instance number threshold (or neighborhood ratio threshold) input section 81 specifies an initial value of the neighborhood instance number threshold (step S811) and calculates an importance degree (step S812) to acquire a list of importance degrees (the list may be presented to a user for confirmation) (step S813). When determining that the importance degree varies greatly (a variation amount exceeds a predetermined value) (Yes in step S814), the neighborhood instance number threshold (or neighborhood ratio threshold) input section 81 increases the current neighborhood instance number threshold (specified value or changed value) by a predetermined value, resets it (step S815), and stores it in the database 24 as a neighborhood instance number threshold.

On the other hand, when determining that the importance degree does not greatly changes (a variation amount does not exceed a predetermined value) (No in step S814), the neighborhood instance number threshold (or neighborhood ratio threshold) input section 81 then determines whether a variation in the importance degree is small (poor) (step S816). When determining that a variation in the importance degree is small (a variation amount falls below a predetermined value) (Yes in step S816), neighborhood instance number threshold (or neighborhood ratio threshold) input section 81 decreases the current neighborhood instance number threshold (specified value or changed value) by a predetermined value, resets it (step S817), and stores it in the database 24 as a neighborhood instance number threshold.

When determining that a variation in the importance degree is not poor (No in step S816), the neighborhood instance number threshold (or neighborhood ratio threshold) input section 81 sets the current neighborhood instance number threshold without change and ends this flow.

It goes without saying that a user may make a determination in the above determination steps or determine an input value and set it in the above changing steps of a neighborhood instance number threshold (neighborhood ratio threshold).

Hereinafter, a difference between the abovementioned present embodiment and a conventional method will be described using an example of "buying history". In the following description, the neighborhood instance number threshold is specified by a user.

"age" is set as an explanatory variable and "buying history" is set as an objective variable. "age" is a numeric variable ranging from 26 to 44 and changing one by one. "buying history" includes two values of "presence" and "absence".

Assumed is an instance set in which importance degree, which is obtained based on the number of instances and objective variable distribution in each age by using the equation (1), is as shown in FIG. 12.

Under the above condition, a comparison among two conventional methods (sectioning and moving average) and the present embodiment is made of how the objective variable distribution and importance degree is close to a real value.

Although an instance set that does not include an error has been prepared, actual data includes an error. In such a situation, it is necessary to reduce the influence of an error as much as possible by increasing the number of instances to be used in calculation of an objective variable distribution in each section to some degree.

In the following methods, accordingly, parameters for each method are determined so that the number of instances to be used for calculating an objective variable distribution in each section becomes 100 or more. Note that a calculation result is rounded to two decimal places.

(Conventional Method (Method Based on Sectioning))

In order for each section to include 100 or more instances, the explanatory variable (age) is equally divided into two sections of "26 to 35 years old" and "36 to 44 years old". In this case, the number of instances in each section, objective value variable, and importance degree are as shown in FIG. 13.

(Conventional Method (Moving Average))

In order for each moving average width to include 100 or more instances, if at all possible, the moving average width is set to 5 (average is calculated within and between 5 years old around a target section). In this case, the number of instances in moving average width, objective variable distribution, and importance degree are as shown in FIG. 14.

(Method According to Present Embodiment)

When the method according to the present embodiment is used to perform calculation for each section (age) with a neighborhood ratio threshold set to 0.1, the number of neighborhood instances, objective variable distribution, and importance degree of each section are as shown in FIG. 15 (ages having the same result are combined together in a table row).

Figure 16:
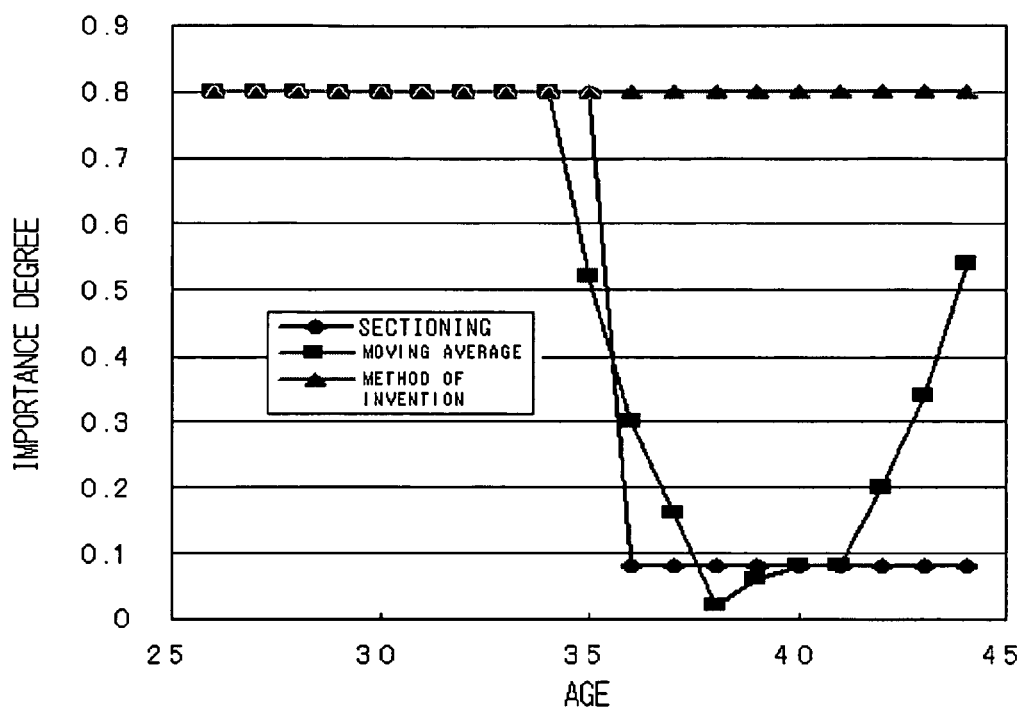
FIG. 16 is a graph showing a result obtained according to conventional methods and a method of the present embodiment.

Importance degree for each age obtained according to the above three methods is shown in FIG. 16.

In the conventional method, an objective variable distribution and an importance degree largely differ from the real importance value (always 0.8) in age sections more than 35 years old. On the other hand, in the method of the present embodiment, a proper objective variable distribution and importance degree are obtained. This reveals that by using the method of the present embodiment, it is possible to obtain an importance degree corresponding to a fine section size and less subject to an error even in an explanatory variable in which frequency drastically changes.

An example in which the present embodiment is used to perform calculation for time-series data will next be described. "age" is set as an explanatory variable, and "buying history" is set as an objective variable. In addition, "year" in which the data has been gathered is set as another explanatory variable. "age" is divided into two sections and average values thereof are set to 20 years old and 30 years old, respectively. Similarly, "year" is divided into three sections of year 2000, year 2001, and year 2002. The number of instances and objective variable distribution in each section and simple importance degree of each section are as shown in FIG. 17. The table of FIG. 17 reveals that the sections of 2000 and 2001 include a small number of instances and therefore include a large error in the objective variable distribution, respectively.

The entire objective variable distribution is 0.5:0.5. 0.1 is specified as a neighborhood ratio threshold.

The abovementioned equation (equations (2A and 2B)) which has been described in (4: Case where plurality of explanatory variables (explanatory variable group) are specified) is used to calculate a distance between sections, and a result is as shown in FIG. 18.

Figures 19, 20:
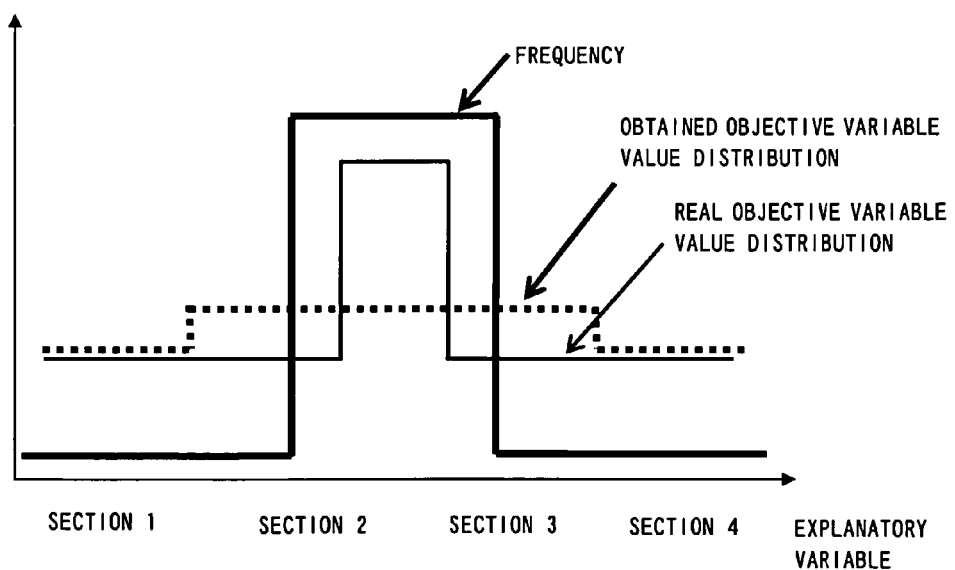
FIG. 19 is a view showing a calculation result obtained according to the present embodiment.
FIG. 20 is a view showing an example of a frequency, a real objective variable distribution and an objective variable distribution obtained using a conventional method (sectioning)
Figure 21:
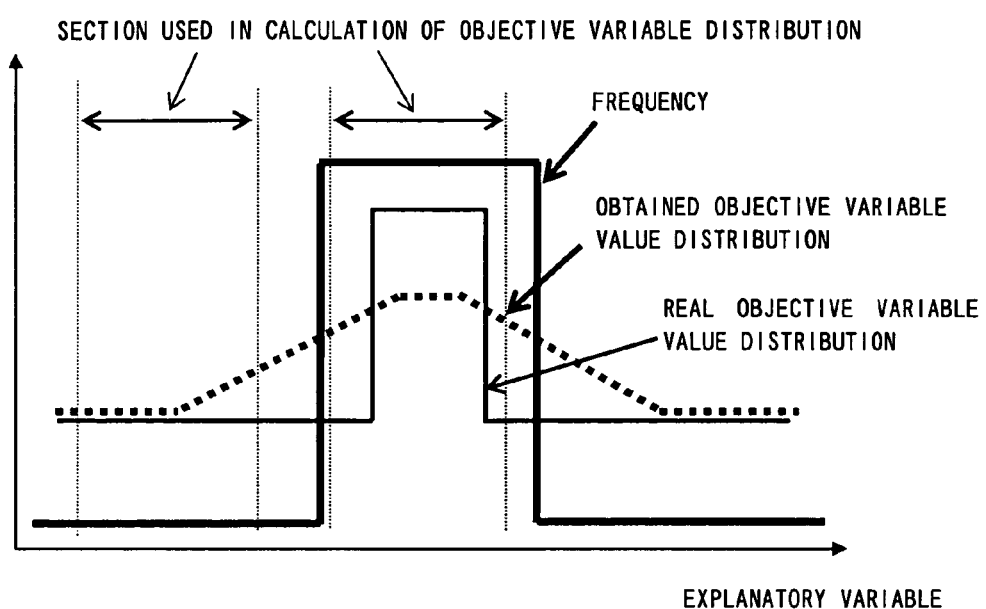
FIG. 21 is a view showing an example of a frequency, a real objective variable distribution, and an objective variable distribution obtained using a conventional method (moving average).

A similar instance set of each section is calculated according to the above distances, and a method described in (1: Basic configuration) is used to calculate an objective variable distribution in each section and an importance degree of each section. The result is shown in FIG. 19.

As described above, according to the present invention, a comparison between a simple importance degree of each section and an importance degree of the above table reveals that a large variation in the importance degree in the low frequency sections is reduced to thereby reduce the influence of an error.

In the above embodiment of the present invention, it is possible to allow a computer to execute an importance degree calculation method by storing the respective steps shown in the flowcharts in a computer-readable storage medium as an importance degree calculation program. The computer-readable storage medium mentioned here includes: a portable storage medium such as a CD-ROM, a flexible disk, a DVD disk, a magneto-optical disk, or an IC card; a database that holds computer program; another computer and database thereof; and a transmission medium on a network line.

What is claimed is:

1. A computer-readable storage medium storing an importance degree calculation program allowing a computer to execute operations calculating importance degree from an instance set and an explanatory variable, comprising:
    a section generation step that receives, as an input, an instance set and an explanatory variable and uses the instance set to divide the explanatory variable into a plurality of sections to obtain a section set;
    a neighborhood instance set extraction step that extracts, using the instance set, from across all the obtained sections a neighborhood instance set of each section in which a number of instances is greater than a neighborhood instance number threshold, stores the extracted neighborhood instance set in a neighborhood instance set database, and outputs the extracted neighborhood instance set from the neighborhood instance set database;
    an objective variable distribution calculation step that calculates an objective variable distribution from the output extracted neighborhood instance set of each section extracted by the neighborhood instance set extraction step;
    an importance degree calculation step that calculates importance degree of each section from the obtained objective variable distribution in each section obtained by the objective variable distribution calculation step and instance set; and
    an importance degree list display step that displays a list of the calculated importance degrees.

2. The computer-readable storage medium storing the importance degree calculation program according to claim 1, wherein
    the neighborhood instance set extraction step comprises:
    a neighborhood section set extraction step that uses the instance set, section set, and neighborhood instance number threshold to output a neighborhood section set of each section in which the sum of instances exceeds the neighborhood instance number threshold; and
    a neighborhood instance set output step that outputs, as a neighborhood instance set, an instance set included in the neighborhood section set of each section obtained by the neighborhood section set extraction step.

3. The computer-readable storage medium storing the importance degree calculation program according to claim 1, wherein
    in the case where a category value variable is specified as an explanatory variable and a distance between category values is used,
    the section generation step outputs respective category values existing in the explanatory variable as a section, and
    the neighborhood instance set extraction step uses the sections generated by the section generation step and distance between category values to extract neighborhood instances in the ascending order in terms of the distance between category values.

4. The computer-readable storage medium storing the importance degree calculation program according to claim 2, wherein
    in the case where a category value variable is specified as an explanatory variable and a distance between category values is used,
    the section generation step outputs respective category values existing in the explanatory variable as a section, and
    the neighborhood instance set extraction step uses the sections generated by the section generation step and distance between category values to extract neighborhood sections in the ascending order in terms of the distance between category values.

5. The computer-readable storage medium storing the importance degree calculation program according to claim 1, wherein
    in the case where a plurality of explanatory variables are used,
    the section generation step outputs a section set in which each section is constituted by a combination of sections of respective explanatory variables.

6. The computer-readable storage medium storing the importance degree calculation program according to claim 5, wherein
    in the case where a variable representing time is included in the plurality of explanatory variables,
    the section generation step outputs a section set in which sections are arranged in time-series.

7. The computer-readable storage medium storing the importance degree calculation program according to claim 1, comprising:
    a neighborhood instance number threshold input step that inputs a neighborhood instance number threshold, wherein
    the neighborhood instance number threshold input step and importance degree list display step are alternately repeated based on the user's determination.

8. The computer-readable storage medium storing the importance degree calculation program according to claim 1, comprising a neighborhood instance number threshold calculation step that uses an instance set and a neighborhood ratio threshold to output the product of the number of instances in the instance set and neighborhood ratio threshold as the instance number threshold.

9. The computer-readable storage medium storing the importance degree calculation program according to claim 8, comprising:
    a neighborhood ratio threshold input step that inputs a neighborhood ratio threshold; and
    an importance degree list display step that displays a list of importance degrees, wherein
    the neighborhood ratio threshold input step and importance degree list display step are alternately repeated based on the user's determination.

10. The computer-readable storage medium storing the importance degree calculation program according to claim 1, wherein
the objective variable distribution calculation step calculates a distance between each instance in a neighborhood instance set and a section serving as a criterion and uses a weight which increases as the distance decreases to calculate an objective variable distribution.

11. An importance degree calculation apparatus, comprising:
a section generation section that receives, as an input, an instance set and an explanatory variable and uses the instance set to divide the explanatory variable into a plurality of sections to obtain a section set;
a neighborhood instance set extraction section that receives, as an input, the instance set, the section set obtained by the section generation section, and a neighborhood instance number threshold, extracts from across all sections a neighborhood instance set of each section in which a number of instances is greater than the neighborhood instance number threshold, stores the extracted neighborhood instance set in a neighborhood instance set database, and outputs the extracted neighborhood instance set from the neighborhood instance set database;
an objective variable distribution calculation section that calculates an objective variable distribution from the output extracted neighborhood instance set of each section extracted by the neighborhood instance set extraction section;
an importance degree calculation section that calculates importance degree of each section from the obtained objective variable distribution in each section obtained by the objective variable distribution calculation section and instance set; and
a display section displaying a list of the calculated importance degrees.

12. The importance degree calculation apparatus according to claim 11, wherein
the neighborhood instance set extraction section comprises:
a neighborhood section set extraction section that receives, as an input, the instance set, section set, and neighborhood instance number threshold to output a neighborhood section set of each section in which the sum of instances exceeds the neighborhood instance number threshold; and
a neighborhood instance set output section that outputs, as a neighborhood instance set, an instance set included in the neighborhood section set of each section obtained by the neighborhood section set extraction section.

13. The importance degree calculation apparatus according to claim 11, wherein
in the case where a category value variable is input as an explanatory variable,
the section generation section outputs respective category values existing in the explanatory variable as a section, and
the neighborhood instance set extraction section uses the sections generated by the section generation section and distance between category values to extract neighborhood instances in the ascending order in terms of the distance between category values.

14. The importance degree calculation apparatus according to claim 12, wherein
in the case where a category value variable is input as an explanatory variable,
the section generation section outputs respective category values existing in the explanatory variable as a section, and
the neighborhood section set extraction section uses the sections generated by the section generation step and an input distance between category values to extract neighborhood sections in the ascending order in terms of the distance between category values.

15. The importance degree calculation apparatus according to claim 11, wherein
in the case where a plurality of explanatory variables are input,
the section generation section outputs a section set in which each section is constituted by a combination of sections of respective explanatory variables.

16. The importance degree calculation apparatus according to claim 11, comprising:
a neighborhood instance number threshold input section that inputs a neighborhood instance number threshold, wherein
the input of a neighborhood instance number threshold and display of a list of importance degrees are alternately repeated based on the user's determination.

17. The importance degree calculation apparatus according to claim 11, comprising a neighborhood instance number threshold calculation section that receives, as an input, an instance set and a neighborhood ratio threshold to output the product of the number of instances in the instance set and neighborhood ratio threshold as the instance number threshold.

18. The importance degree calculation apparatus according to claim 17, comprising:
a neighborhood ratio threshold input section that inputs a neighborhood ratio threshold; and
an importance degree list display section that displays a list of importance degrees, wherein
the input of a neighborhood ratio threshold and display of a list of importance degrees are alternately repeated based on the user's determination.

19. The importance degree calculation apparatus according to claim 11, wherein
the objective variable distribution calculation section calculates a distance between each instance in a neighborhood instance set and a section serving as a criterion and uses a weight which increases as the distance decreases to calculate an objective variable distribution.

20. A method of calculating importance degree from an instance set and an explanatory variable, comprising:
electronically receiving, as an input, an instance set and an explanatory variable and using the instance set to divide the explanatory variable into a plurality of sections to obtain a section set; and
using a computer extracting, using the instance set, from across all the obtained sections a neighborhood instance set of each section in which a number of instances is greater than a neighborhood instance number threshold, storing the extracted neighborhood instance set in a neighborhood instance set database, and outputting the extracted neighborhood instance set from the neighborhood instance set database;
calculating an objective variable distribution from the output extracted neighborhood instance set of each section;
calculating an importance degree of each section from the obtained objective variable distribution in each section; and
displaying a list of the calculated importance degrees.

* * * * *